US012122145B2

(12) United States Patent
Sudermann

(10) Patent No.: US 12,122,145 B2
(45) Date of Patent: Oct. 22, 2024

(54) METHOD FOR AUTOMATICALLY EXCHANGING A SLEEVE OF A PRINTING TOOL

(71) Applicant: BOBST BIELEFELD GMBH, Bielefeld (DE)

(72) Inventor: Alexander Sudermann, Schloss Holte-Stukenbrock (DE)

(73) Assignee: BOBST BIELEFELD GMBH, Bielefeld (DE)

( * ) Notice: Subject to any disclaimer, the term of this patent is extended or adjusted under 35 U.S.C. 154(b) by 0 days.

(21) Appl. No.: 18/248,737

(22) PCT Filed: Oct. 12, 2021

(86) PCT No.: PCT/EP2021/078093
§ 371 (c)(1),
(2) Date: Apr. 12, 2023

(87) PCT Pub. No.: WO2022/084090
PCT Pub. Date: Apr. 28, 2022

(65) Prior Publication Data

US 2023/0405987 A1 Dec. 21, 2023

(30) Foreign Application Priority Data

Oct. 19, 2020 (EP) .................................... 20202614

(51) Int. Cl.
*B41F 27/12* (2006.01)
*B41F 5/24* (2006.01)

(52) U.S. Cl.
CPC ............ *B41F 27/1206* (2013.01); *B41F 5/24* (2013.01)

(58) Field of Classification Search
CPC ............................... B41F 27/1206; B41F 5/24
See application file for complete search history.

(56) References Cited

U.S. PATENT DOCUMENTS 4,823,693 A * 4/1989 Kobler .................... B41F 13/36 29/446
5,638,754 A * 6/1997 Steinmeier .............. B41F 13/26 101/477

(Continued)

FOREIGN PATENT DOCUMENTS

| | | | |
|---|---|---|---|
| EP | 3251845 | A1 | 12/2017 |
| EP | 3378645 | A1 | 9/2018 |
| WO | 2009146819 | A1 | 12/2009 |

*Primary Examiner* — David H Banh
(74) *Attorney, Agent, or Firm* — Bookoff McAndrews, PLLC

(57) ABSTRACT

A method is provided for automatically exchanging a sleeve (18*a*) of a printing tool (14, 16, 18, 22, 24) mounted in a printing machine (12), in particular a flexographic printing machine, by means of a printing tool handling unit (28) comprising a coupling interface (36). In one step of the method the printing tool handling unit (28) is temporarily coupled to a coupling interface (46) located at the end of a shaft (54, 56, 58, 60) of the printing tool (14, 16, 18, 22, 24) with its coupling interface (36). In a further step, the printing tool handling unit (28) transports the printing tool (14, 16, 18, 22, 24) to a separation unit (78) comprising at least one clamping device (80, 82, 84) and places the printing tool (14, 16, 18, 22, 24) in the clamping device (80) of the separation unit (78). The printing tool (14, 16, 18, 22, 24), in particular a sleeve (18*a*) of the printing tool (14, 16, 18, 22, 24), is clamped by the clamping device (80), and the printing tool handling unit (28) separates the shaft (54, 56, 58, 60) from the sleeve (18*a*) by pulling the shaft (54, 56, 58, 60) out of the sleeve (18*a*) while the sleeve (18*a*) is clamped in the clamping device (80).

10 Claims, 9 Drawing Sheets

(56) References Cited

U.S. PATENT DOCUMENTS

Figure 1:
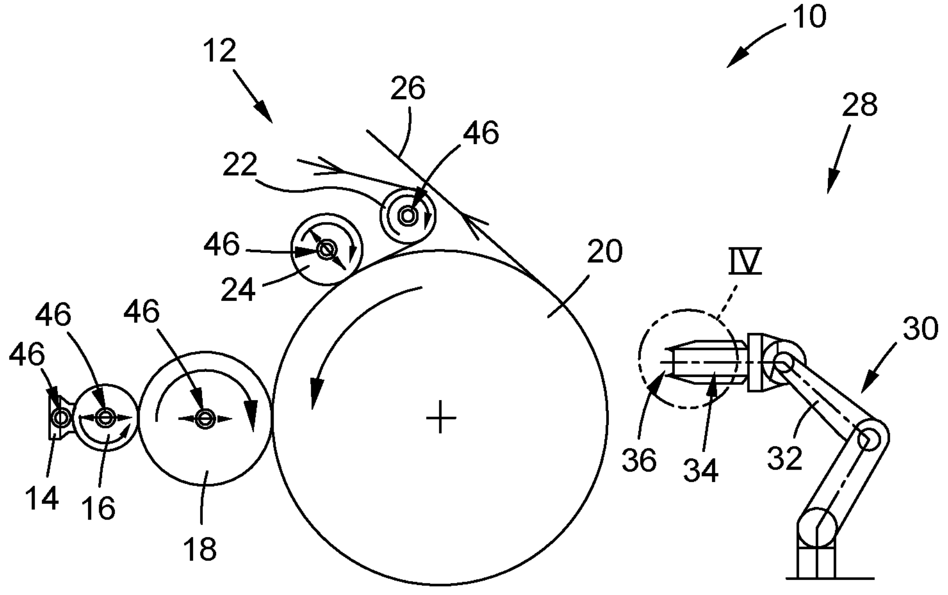

| | | | |
|---|---|---|---|
| 5,878,666 A | 3/1999 | Schneider et al. | |
| 6,726,433 B1 * | 4/2004 | Blake | B41C 1/1083 414/331.1 |
| 7,748,317 B2 * | 7/2010 | Puig Vila | B41F 27/1206 101/477 |
| 2009/0028613 A1 * | 1/2009 | Plasswich | B41F 27/105 399/297 |
| 2016/0243872 A1 * | 8/2016 | Ruiz Suesa | B41F 27/105 |
| 2017/0217156 A1 * | 8/2017 | Puig Vilà | B41F 27/14 |
| 2017/0368863 A1 * | 12/2017 | Morikawa | B41C 1/05 |

* cited by examiner

METHOD FOR AUTOMATICALLY EXCHANGING A SLEEVE OF A PRINTING TOOL

CROSS-REFERENCE TO RELATED APPLICATION(S)

This application is a National Stage Application under 35 U.S.C. § 371 of International Application No. PCT/EP2021/078093, filed Oct. 12, 2021, which claims priority to European Application No. 20202614.2, filed on Oct. 19, 2020, the entireties of which are incorporated herein by reference.

The invention relates to a method for automatically exchanging a sleeve of a printing tool mounted in a printing machine of a printing assembly, in particular a flexographic printing machine, having at least two printing tools.

Printing assemblies and printing tools as mentioned above are known in the art. In this context, a printing tool is to be understood as a part of the printing machine that is involved in the printing process realized by the printing machine. In particular printing cylinders, anilox rollers, blade beams, impression cylinders, guide rollers and pressure rollers are considered to be printing tools. Additionally, all rollers and shafts which are used for guiding and supporting the substrate within the printing machine are printing tools within the above definition. All these printing tools have in common that they need to be exchanged on a regular basis. This can be due to the change of a print job, wear or cleaning requirements.

In known printing assemblies the printing tools are exchanged manually. The corresponding printing machine has to be stopped for the time needed to perform the exchange.

For selected printing tools, e.g. the printing cylinders, automatic handling devices have been suggested as an alternative to a manual exchange. These handling devices are specifically tailored to the printing tool to be exchanged. Usually, such handling devices comprise a transport shaft and are configured for pulling a sleeve and/or an adapter of a printing cylinder to be exchanged on the transport shaft. The shaft on which the sleeve and/or the adapter is operated within the printing machine stays in the printing machine. These handling devices usually are expensive since they need to be adapted for handling the sleeve and/or adapter which mostly are fragile or at least easily damageable. Furthermore, they need to be adapted to the specific printing cylinder to be exchanged which requires a certain engineering effort. Due to the transport shaft the handling device itself is rather bulky and costly. Additionally, the time during which the printing machine has to be stopped can only be reduced by a certain share since the remaining tools still need to be exchanged manually.

The problem to be solved by the present invention is therefore to provide a solution for exchanging the sleeves and/or adapters of printing tools of a printing machine which is able to further reduce the time needed for performing the exchange procedure. Additionally, the solution shall be simple, reliable and efficient in terms of cost.

This problem is solved by a method for automatically exchanging a sleeve of a printing tool mounted in a printing machine, in particular a flexographic printing machine, by means of a printing tool handling unit comprising a coupling interface. In one step of the method, the printing tool handling unit is temporarily coupled to a coupling interface located at the end of a shaft of the printing tool with its coupling interface. In a further step, the printing tool handling unit transports the printing tool to a separation unit comprising at least one clamping device and places the printing tool in the clamping device of the separation unit. The printing tool, in particular a sleeve of the printing tool, is clamped by the clamping device. In a further step of the method, the printing tool handling unit separates the shaft from the sleeve by pulling the shaft out of the sleeve while the sleeve is clamped in the clamping device.

According to the inventive method, the advantage is achieved that an exchange of the sleeve takes place in a completely automatic manner. In particular, the removal of the printing tool from the printing machine and the separation of the sleeve from the rest of the printing tool may occur without setting down the printing tool respectively without decoupling the printing tool from the printing tool handling unit. Thereby, the exchange of the sleeve takes place in a very quick and simple manner.

According to a preferred embodiment, the printing tool is removed from the printing machine by moving the printing tool along its axis of rotation. Thereby, different printing tools can be removed from the printing machine independently of each other. For example, a printing tool that is surrounded by further printing tools can be removed by means of the printing tool handling unit without removing any of the other printing tools. Moreover, by moving the printing tool along its axis of rotation, the printing tool must be accessible from one side only.

The shaft may be separated from the sleeve by pulling the shaft out of the sleeve along an axis of rotation of the printing tool. The separation of the sleeve from the printing tool is thus achieved by a linear movement. Such a movement is easy to program in a control unit for the printing tool handling unit.

The coupling interface of the printing tool handling unit is preferably moved concentrically to the coupling interface of the printing tool when connecting to the coupling interface of the printing tool. Thus, the printing tool handling unit, in particular an end effector of the printing tool handling unit, moves along a linear path when coupling the coupling interface of the printing tool handling unit to the coupling interface of the printing tool. This also contributes to a low effort for programming the motion of the printing tool handling unit.

According to one embodiment, an adapter is interposed between the shaft of the printing tool and the sleeve and the adapter is separated from the sleeve together with the shaft and afterwards the assembly comprising the adapter and the shaft is moved by the printing tool handling unit to a further clamping device in which the adapter is clamped and the shaft is withdrawn from the adapter. The adapter serves to support the sleeve respectively to bypass a distance between the shaft and the sleeve, such that the sleeve may be kept thin. By removing the adapter from the shaft in a further clamping device, the printing tool is completely disassembled in an automatic manner.

After separating the adapter and the shaft, the shaft is preferably moved to another clamping device and clamped therein. Thereby, the shaft may be stored in a simple manner.

According to a preferred embodiment, after clamping the shaft in the clamping device, the shaft is separated from the printing tool handling unit. The printing tool handling unit may then be used for removing another printing tool from the printing machine.

Preferably, the printing tool handling unit is coupled to the coupling interface of the shaft all the time during the removal of the printing tool from the printing machine until the shaft is stored.

The clamping device for example comprises at least two clamping jaws, wherein the printing tool is surrounded by the clamping jaws when the printing tool is inserted in the separation unit and wherein the clamping jaws are moved towards the printing tool in a radial direction in order to clamp the sleeve of the printing tool. With such a clamping device, the necessary holding force can be applied to a sleeve in order to enable a removal of the shaft from the sleeve. In particular, the holding fore has to be big enough to avoid that the sleeve slides out of the clamping device together with the shaft.

By providing several clamping jaws that are distributed around the circumference of the sleeve, the holding force may be distributed uniformly.

The further clamping devices for clamping the adapter and the shaft may be designed in the same manner.

In a preferred embodiment, the separation of the sleeve and/or the adapter from the shaft is performed in a fully automatic manner by the printing tool handling unit. In other words, the separation of the sleeve and/or the adapter from the shaft does not require any manual activity of a user. Thus, the separation of the sleeve and/or the adapter from the shaft is very quick and easy.

When placing a new printing tool in the printing machine, the method steps described above are performed in a reverse order. Thereby, the setup time of the printing machine may be reduced significantly.

According to one embodiment, the shaft of the printing tool is supported in the printing machine double sided, wherein a support of the printing tool is removed on one side in order to access the printing tool with the printing tool handling unit. By means of a removable support, the printing tool is reliably supported in the printing machine during operation of the printing machine. By removing the support on one side, a good accessibility of the printing tool is achieved.

An exemplary printing assembly of the type mentioned above comprises a printing tool handling unit being configured for automatically withdrawing the printing tools from the printing machine and for automatically inserting the printing tools into the printing machine according to the inventive method described above. The printing tool handling unit comprises a coupling interface and each of the at least two printing tools comprises a complementary coupling interface such that the printing tool handling unit can at least temporarily be coupled to each of the at least two printing tools via the respective coupling interfaces. In the present context withdrawing a printing tool from the printing machine means unloading the printing tool from the printing machine. Inserting a printing tool into the printing machine is the same as loading the printing tool into the printing machine. Furthermore, the interfaces at the printing tools are substantially identical. The printing tool handling unit thus is configured for handling all of the printing tools, wherein the printing tool handling unit preferably handles one printing tool at a time. Consequently, the exchange of the printing tools is performed in a fully automated manner. Consequently, the exchange procedure can be performed within a relatively short time. At the same time only one printing tool handling unit is needed since it is able to interact with all of the printing tools. The printing tool handling unit is thus universal. As a consequence thereof, the printing assembly is structurally simple and cost-efficient.

The coupling interfaces provided on the printing tool handling unit and on the printing tools may be standardized. This means that the coupling interfaces provided on printing tools of different printing machines may be substantially identical. As a consequence thereof, the coupling interfaces of the corresponding printing tool handling units may also be substantially identical. Thus, such printing tool handling units may be used in different printing assemblies comprising different printing machines. Such a configuration further reduces the costs for a printing assembly, since especially the interfaces and the printing tool handling unit only needs to be developed once.

According to an embodiment, the printing tool handling unit comprises an end effector, wherein the coupling interface is mounted on or provided at the end effector. The end effector and the coupling interface mounted thereon or provided thereat may thus be provided as a module which can be used in connecting with varying handling devices. Consequently, the printing tool handling unit can be produced and operated at comparatively low costs.

Preferably, the end effector is mounted at or provided on an end of an arm, in particular a robot arm. A printing tool handling unit having such an arm is able to cover a relatively large range of motion. Consequently, the printing tool handling unit can interact with printing tools being arranged at different positions within the printing machine. In an especially preferred embodiment, the arm is a robot arm and thus the printing tool handling unit comprises an industrial robot. As a consequence thereof, the printing tool handling unit can rely on standard equipment except for the coupling interface.

The printing tool comprises a coupling interface for at least temporarily connecting the printing tool to a printing tool handling unit. Such a printing tool can be easily and reliably withdrawn from a corresponding printing machine by a printing tool handling unit. Of course, such a printing tool can also be easily and reliably inserted into the corresponding printing machine by the printing tool handling unit. In other words, the printing tool can be easily and reliably exchanged. If the printing tool handling unit is operated in an automatic manner, only a very short time is needed to do so. Thus, the operational time of a printing machine equipped with such a printing tool can be extended.

According to a variant, the printing tool is a roller assembly comprising a shaft, wherein the coupling interface is located at an end of the shaft. Thus, the printing tool can be maneuvered in a stable and reliable manner. Moreover, the risk of damaging a sleeve and/or an adapter of the printing tool is reduced. This is especially true in comparison to known printing tools, wherein the sleeve and/or the adapter are gripped when performing an exchange procedure.

Alternatively, the printing tool is formed as a beam, wherein the coupling interface is located at an end of the beam. Thus, also beam-shaped printing tools can be exchanged in a simple and reliable manner. Of course, the exchange procedure is performed fully automatically if the printing tool handling unit is able to operate automatically.

In all of the above alternatives, the coupling interface may comprise a conical or frustoconical contact surface. Such a contact surface is simple in design and thus can also be produced in a cost-efficient manner. Furthermore, the contact surface allows for coupling the printing tool and the printing tool handling unit in a very precise manner. Consequently, the printing tool can be maneuvered very precisely. Additionally, a conical or frustoconical contact surface can easily support high forces such that heavy printing tools may be moved.

In this context, the contact surface of the coupling interface provided on the printing tool handling unit may be an inside surface of an opening and the contact surface of the corresponding coupling interfaces at the printing tools may be an outside surface. Of course, it is also possible to design the contact surface of the coupling interface provided on the printing tool handling unit as an outside surface and the contact surface of the coupling interfaces at the printing tools as an inside surface of an opening. In both alternatives the contact surface being designed as an outside surface may be provided on a hollow portion of the printing tool or the printing tool handling unit respectively.

Advantageously, the coupling interface is formed integrally with the end of the shaft or the end of the beam. Consequently, the coupling interface is inseparably connected to the respective shaft or beam. Furthermore, assembly efforts in relation with the coupling interface are eliminated. All in all, such shafts or beams can be produced in an efficient manner.

The coupling interface may also be formed on an interface part being mounted on the shaft or on the beam. In this alternative the interface part is produced independently from the corresponding shaft or beam and subsequently mounted thereon. This is advantageous if printing tools shall be retrofitted with coupling interfaces. Another advantage is that the production of a printing tool without a coupling interface and the production of an interface part as such may be easier than the production of a printing tool having the coupling interface formed integrally therewith.

In an embodiment, the coupling interface comprises a securing means for at least temporarily securing the printing tool at the printing tool handling unit. Preferably, the securing means is separate from the contact surface. It guarantees that the contact surface of the coupling interface provided on the printing tool does not separate from the contact surface of the coupling interface provided on the printing tool handling unit in an undesired manner. Consequently, the printing tool may be handled in a reliable and safe manner.

For example, the securing means comprises at least one securing claw or a securing collar being engageable by a securing claw. In this context the securing claws may be selectively movable into a release position or a securing position. This is preferably done in a fully automatic manner. Consequently, the printing tool and the printing tool handling unit may be selectively and automatically secured to one another. As a consequence thereof, printing tools may be manipulated by the printing tool handling unit in a reliable and safe manner. In a preferred variant at least one securing claw is provided on the printing tool handling unit and a corresponding securing collar is arranged on the printing tool. However, the cinematically inversed solution is also possible.

It is possible that the printing tool comprises a coupling interface at both ends, in particular wherein the coupling interfaces at both ends are substantially identical. Consequently, the arrangement of the printing tool within a printing machine is independent from the positioning of the printing tool handling unit.

In an alternative, the coupling interface is a combined coupling and drive interface, which is configured for being connected to a drive unit for driving the printing tool. Thus, the coupling interface is used for temporarily connecting the printing tool to the printing tool handling unit in order to insert it into the printing machine or withdraw it therefrom. When the printing tool is located inside the printing machine, the coupling interfaces is connected to a drive unit. This connection may rely on frictional coupling.

The coupling interface may also be a combined coupling and support interface, which is configured for supporting the printing tool in a printing machine. The support interface may also be designated a bearing interface. The printing tool may especially be rotatorily supported within the printing machine.

The printing tool can be a printing cylinder, an anilox roll, a blade beam, an impression cylinder, a guide roller or a pressure roller. The blade beam is optionally equipped with an ink chamber. All of these printing tools need to be exchanged regularly either due to process constraints, wear and/or the need for cleaning. This exchange can be performed automatically within a relatively short time.

Figure 2:
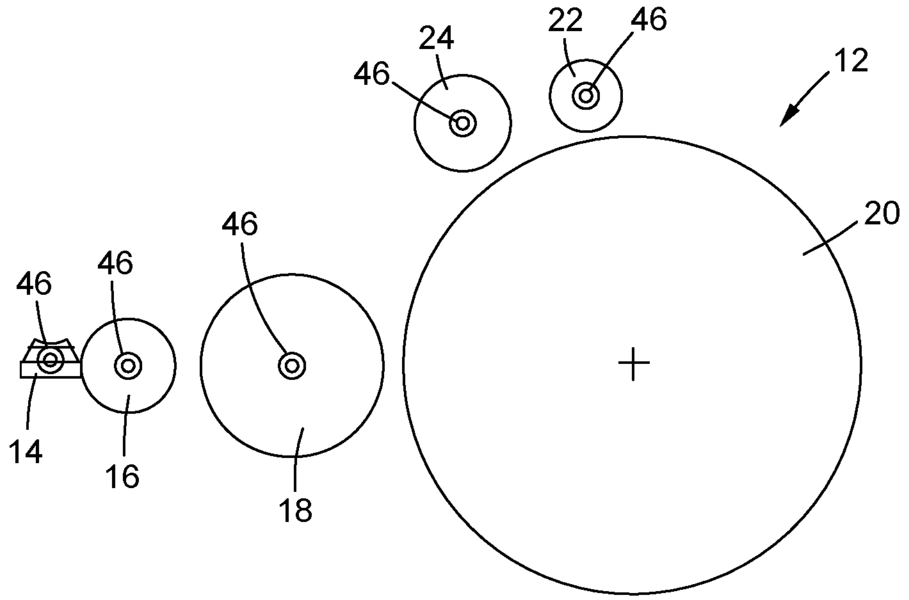
Figure 3:
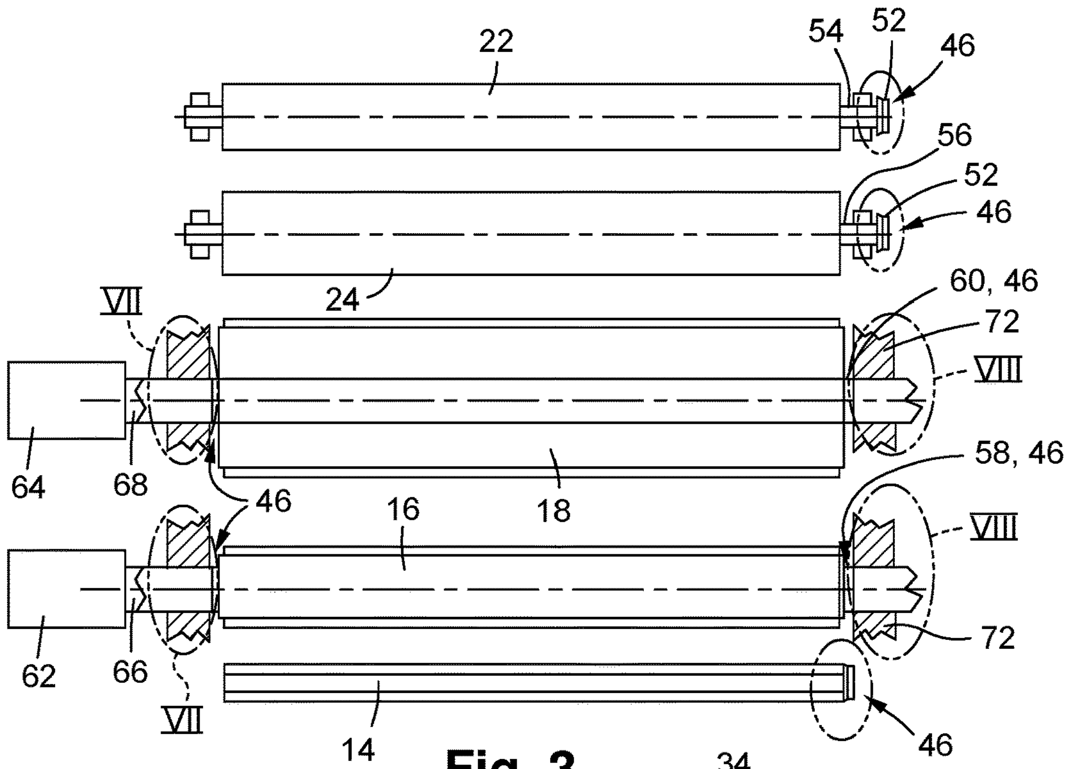
Figure 4:
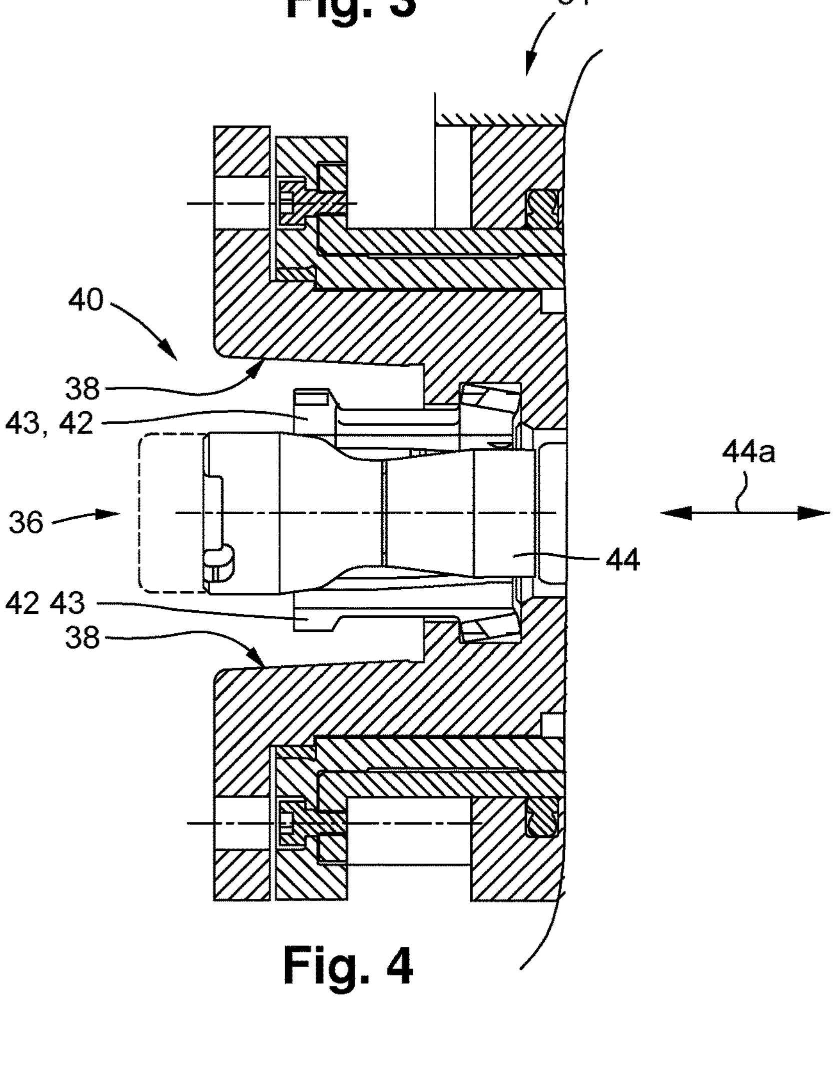
Figure 5:
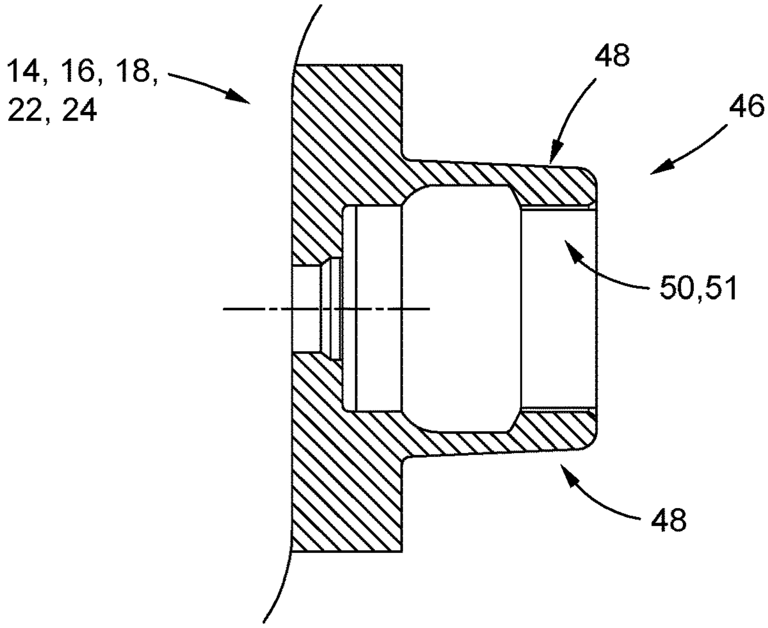
Figure 6:
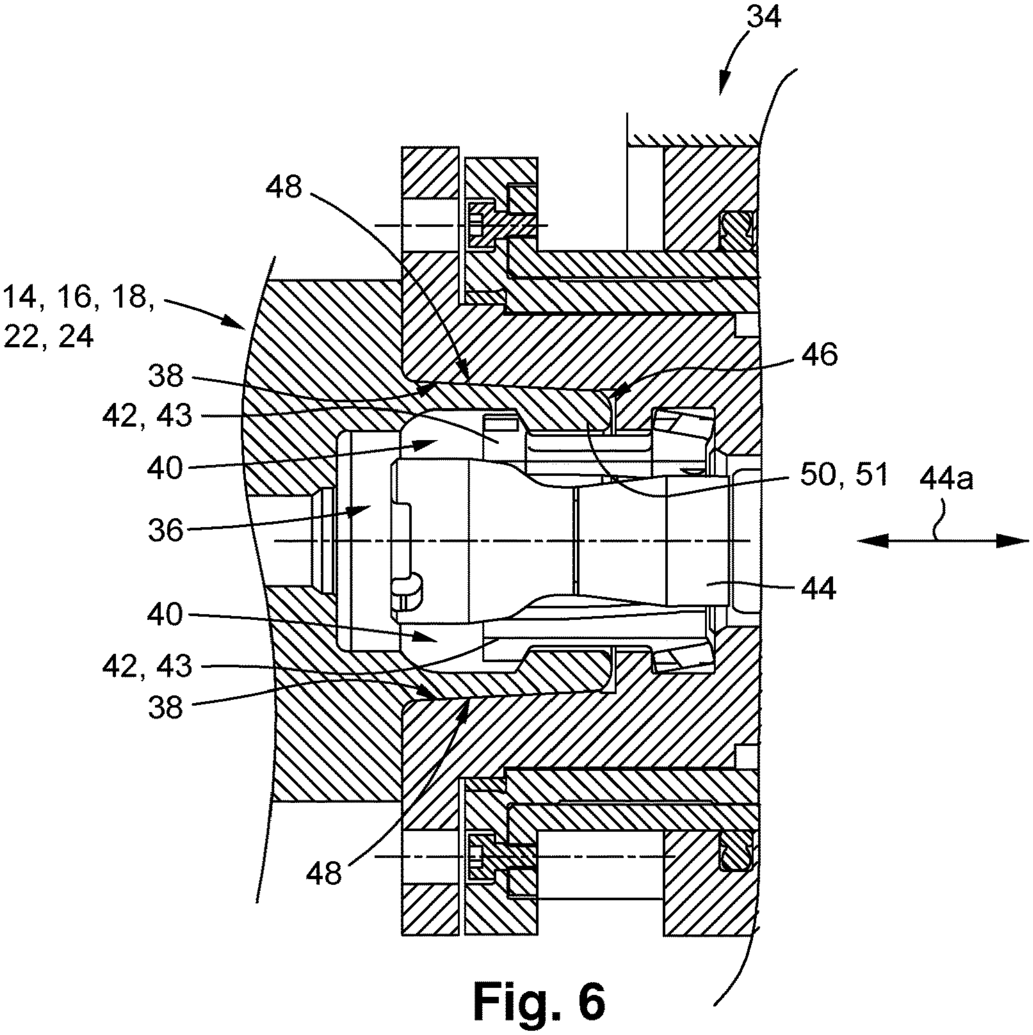
Figure 7:
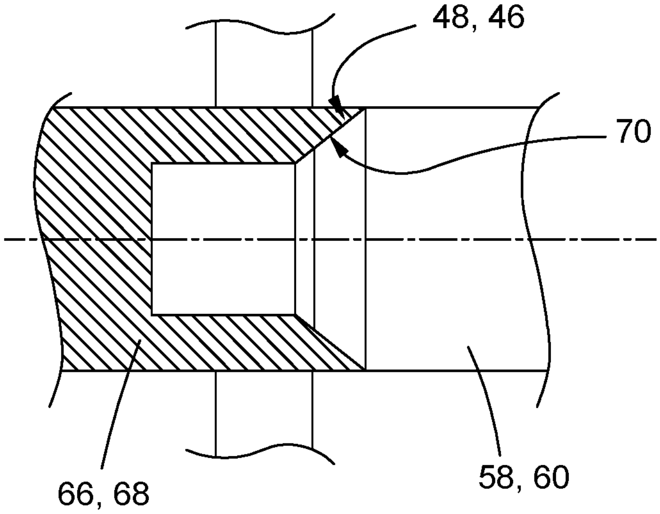
Figure 8:
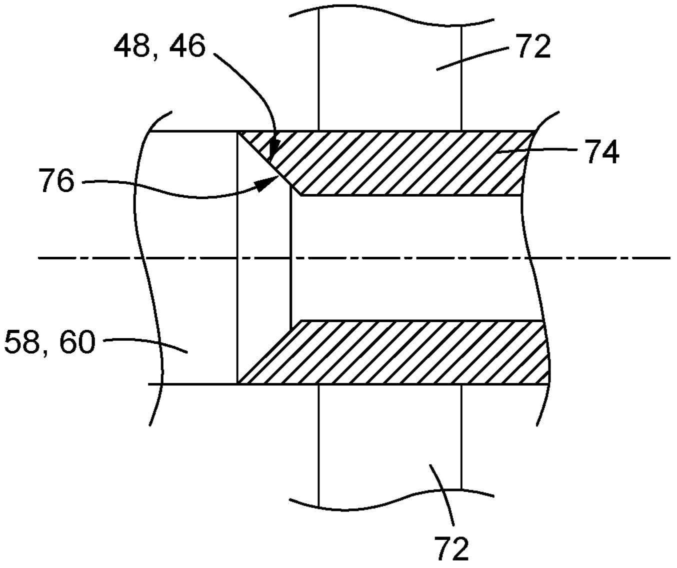

The invention will now be explained with reference to an embodiment which is shown in the attached drawings. In the drawings, FIG. 1 schematically shows a printing assembly according to the invention comprising a printing machine with printing tools according to the invention, wherein the printing machine is in an operational state, FIG. 2 schematically shows the printing machine of the printing assembly of FIG. 1, wherein the printing machine is in a service state, FIG. 3 schematically shows the printing machine of FIG. 2 in a top view, FIG. 4 shows a detail IV of the end effector of a printing tool handling unit of the printing assembly of FIG. 1 in a partially sectional view, FIG. 5 shows a detail of the printing tools of the printing machine of FIG. 3, FIG. 6 shows an exemplary one of the printing tools of the printing machine of FIGS. 2 and 3 being coupled with the printing tool handling unit of the printing assembly of FIG. 1, FIG. 7 shows a detail VII of two of the printing tools of the printing machine of FIG. 3, FIG. 8 shows a detail VIII of two of the printing tools of the printing machine of FIG. 3, and FIGS. 9 to 18 illustrate a procedure during which a printing tool of the printing machine of FIG. 3 is withdrawn from the printing machine.

FIG. 1 shows a printing assembly 10.

It comprises a printing machine 12 which is a flexographic printing machine in the example shown in the Figures.

The printing machine 12 has a blade beam 14, which is equipped with an ink chamber, an anilox roll 16, a printing cylinder 18 and a central impression cylinder 20.

Furthermore, the printing machines 12 comprises a guide roller 22 and a pressure roller 24.

The blade beam 14, the anilox roll 16, the printing cylinder 18, the guide roller 22 and the pressure roller 24 are printing tools.

These printing tools 14, 16, 18, 22, 24 are used for printing ink on a substrate 26.

To this end the substrate 26 travels around the guide roller 22 and the central impression cylinder 20 on which it is pressed by the pressure roller 24. The travelling direction of the substrate 26 and the corresponding directions of rotation are indicated by arrows.

As has been explained before, the blade beam 14 comprises an ink chamber. The ink provided therein is applied to the anilox roll 16 from which it is transferred to a printing plate mounted on the printing cylinder 18. The printing plate comprises a negative of the pattern to be printed on the substrate 26.

Also for these printing tools the directions of rotation are indicated by arrows.

The printing assembly 10 additionally comprises a printing tool handling unit 28 which is configured for automatically withdrawing the printing tools 14, 16, 18, 22, 24 from the printing machine 12 and for automatically inserting the printing tools 14, 16, 18, 22, 24 into the printing machine 12.

In the example shown the printing tool handling unit 28 comprises an industrial robot 30 having a robot arm 32.

An end effector 34 is mounted on an end of the robot arm 32.

The end effector 34 comprises a coupling interface 36 (cf. FIG. 4) which is configured for at least temporarily coupling one of the printing tools 14, 16, 18, 22, 24 to the printing tool handling unit 28.

The coupling interface 36 comprises a contact surface 38 which corresponds to the shell surface of a truncated cone.

In the example shown the contact surface 38 is a portion of an inner surface of an opening 40 provided on the end effector 34.

The coupling interface 36 also comprises a securing means 42 comprising two securing claws 43.

The securing means 42 is configured for at least temporarily securing one of the printing tools 14, 16, 18, 22, 24 at the printing tool handling unit 28.

To this end an actuation rod 44 is provided on the end effector 34 which interacts with the securing claws 43.

The actuation rod 44 is movable along a direction 44*a*.

Consequently, the actuation rod 44 may be provided in a securing position. In this position the securing claws 43 are held in a respective securing position (cf. FIGS. 4 and 6).

Alternatively, the actuation rod 44 may be moved into a release position. In the representation of FIG. 4 this position is shifted to the left as indicated by a dotted line.

In this position the securing claws 43 are also in a respective release position. Compared to the representation in FIG. 4, the left end of the upper securing claw 43 is slightly moved downwards and the left end of the lower securing claw 43 is slightly moved upwards.

More details concerning the coupling interface 36 will be explained below in connection with the procedure of exchanging one of the printing tools 14, 16, 18, 22, 24.

Each of the printing tools 14, 16, 18, 22, 24 comprises a coupling interface 46 for at least temporarily connecting the respective printing tool 14, 16, 18, 22, 24 to the printing tool handling unit 28 (cf. FIG. 5).

The coupling interfaces 46 are complementary to the coupling interface 36.

Thus, also the coupling interfaces 46 comprise a frustoconical contact surface 48.

The contact surface 48 is an outer surface.

Furthermore, each of the coupling interfaces 46 is equipped with a securing means 50 for temporarily securing the respective printing tool 14, 16, 18, 22, 24 to the printing tool handling unit 28.

In the example shown in FIG. 5 the securing means 50 comprises a securing collar 51 which is engageable by the securing claws 43 (cf. FIG. 6).

As far as the guide roller 22 and the pressure roller 24 are concerned, the coupling interface 46 is provided on an interface part 52 which is mounted at a respective end of a shaft 54, 56 of the guide roller 22 and the pressure roller 24 respectively (cf. FIGS. 3 and 5).

The anilox roll 16 and the printing cylinder 18 are roller assemblies having a shaft 58, 60 respectively. The coupling interface 46 is located at an end of the respective shaft 58, 60 and is formed integrally therewith.

The anilox roll 16 and the printing cylinder 18 comprise a coupling interface 46 at both ends of the respective shaft 58, 60. The coupling interfaces at the ends of a shafts 58, 60 are substantially identical.

In the example shown in the Figures, the shafts 58, 60 of the anilox roll 16 and the printing cylinder 18 are connected with respective drive units 62, 64 (cf. FIG. 3). Consequently, the shafts 58, 60 may be designated as driven shafts.

In more detail, each of the drive units 62, 64 comprises an output shaft 66, 68.

The output shafts 66, 68 are connected to the corresponding shaft 58, 60 via the coupling interface 46 (cf. FIG. 7). To this end a corresponding coupling interface 70 is provided on the output shafts 66, 68. The coupling interfaces 46, 70 are connectable via a friction fit.

Consequently, the coupling interface 46 is a combined coupling and drive interface.

It is noted that the coupling interfaces 46, 70 are only schematically represented in FIG. 7. In reality, the coupling interface 46 is designed as shown in FIG. 5 and the coupling interface 70 is designed in accordance with FIG. 4. In this context the securing means 42, 50 are optional.

On the respective ends opposing the drive units 62, 64, the anilox roll 16 and the printing cylinder 18 are supported in a frame 72 of the printing machine 12.

In order to do so, support shafts 74 are rotatorily held in the frame 72 and the shafts 58, 60 are connected to the support shafts 74 via the coupling interface 46 (cf. FIG. 8). The support shafts 74 have a corresponding coupling interface 76.

Again the coupling interfaces 46, 76 are only schematically represented in FIG. 8. In reality, the coupling interface 46 is designed as shown in FIG. 5 and the coupling interface 76 is designed in accordance with FIG. 4. In this context the securing means 42, 50 are optional.

Consequently, the coupling interface 46 of the anilox roll 16 and the printing cylinder 18 is a combined coupling and support interface.

The blade beam 14 only comprises one coupling interface 46 which is located at an end of the beam (cf. FIGS. 3 and 5). This coupling interface 46 is also formed integrally with the blade beam 14.

In the following a printing tool withdrawal procedure will be explained with reference to FIGS. 9 to 18.

In a first step the printing machine 12 needs to be stopped. This means that an operational state thereof is terminated.

It is noted that the printing machine 12 represented in the Figures comprises only one printing station being represented by its essential components, i.e. the blade beam 14, the anilox roll 16 and the printing cylinder 18. In printing machines comprising more than one printing stations it may be sufficient to stop only the relevant printing station for withdrawing the corresponding blade beam, anilox roll or printing cylinder.

If the guide roller 22 or the pressure roller 24 shall be withdrawn from the printing machine 12, usually the entire printing machine 12 is stopped.

Figure 9:
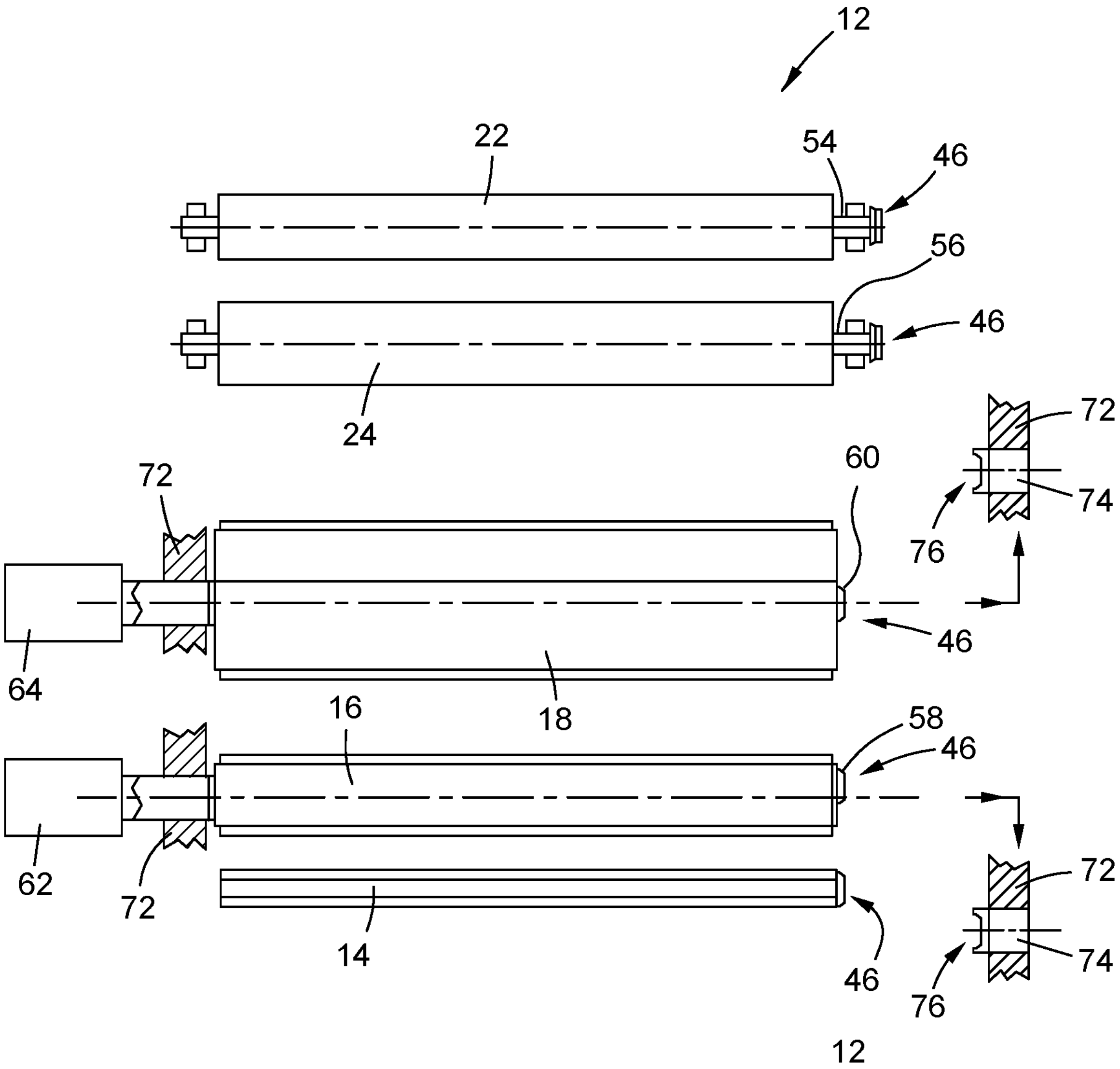

Thereafter, the printing machine 12 is moved to its service state (cf. FIGS. 2, 3 and 9).

This means that all printing tools 14, 16, 18, 22, 24 are moved to a position where they are spaced apart from each other.

In case the guide roller 22 or the pressure roller 24 shall be withdrawn from the printing machine 12, the substrate 26 is removed from the printing machine 12.

Subsequently, a support of the respective printing tool 14, 16, 18, 22, 24 is removed on one side in order to access the printing tool 14, 16, 18, 22, 24 with the printing tool handling unit, more precisely with the end effector. In particular, portions of the frame 72 carrying the support shafts 74 are removed from the remaining portions of the frame 72 in order to render the printing cylinder 18 and the anilox roll 16 accessible by the printing tool handling unit 28 (cf. arrows in FIG. 9).

Figure 10:
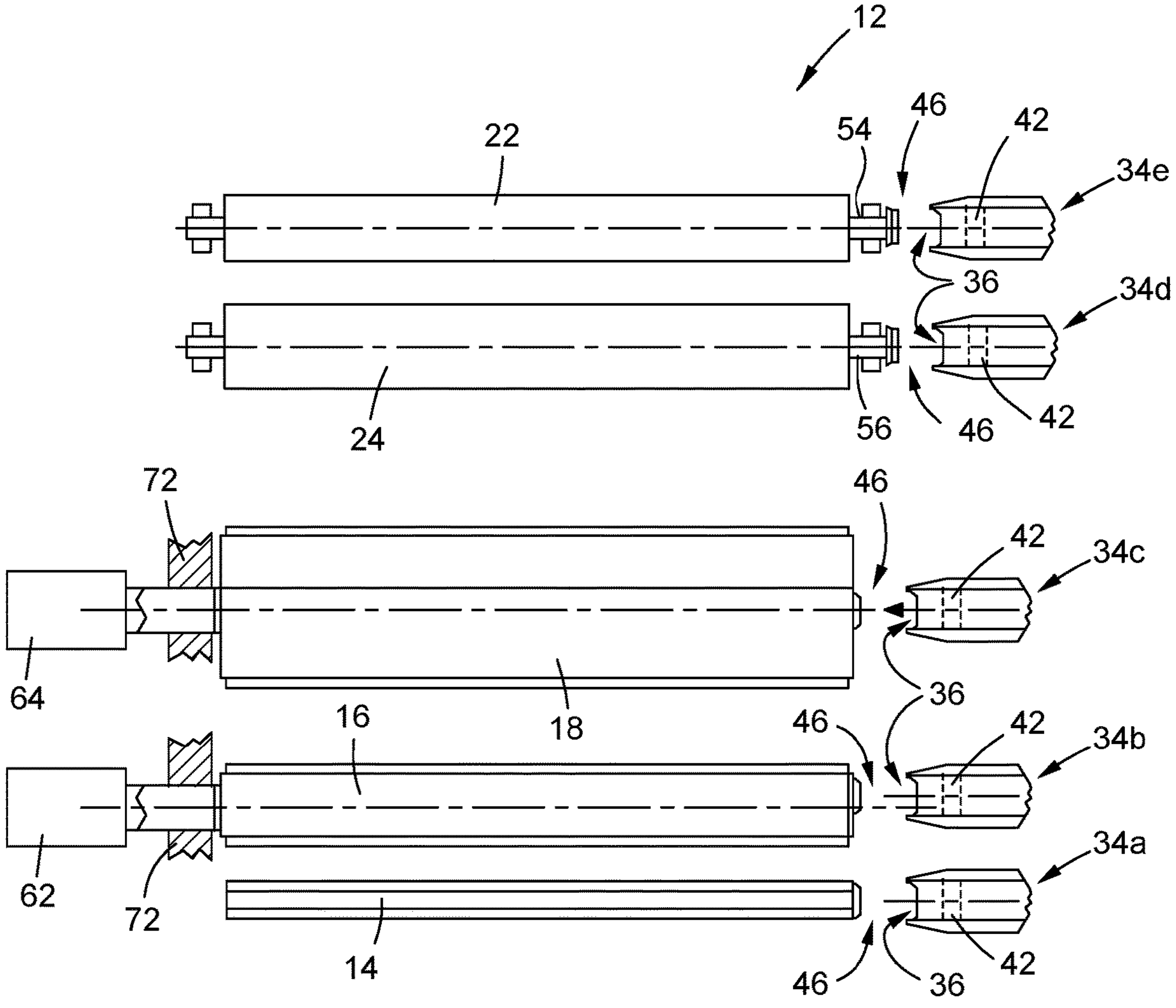
Figure 11:
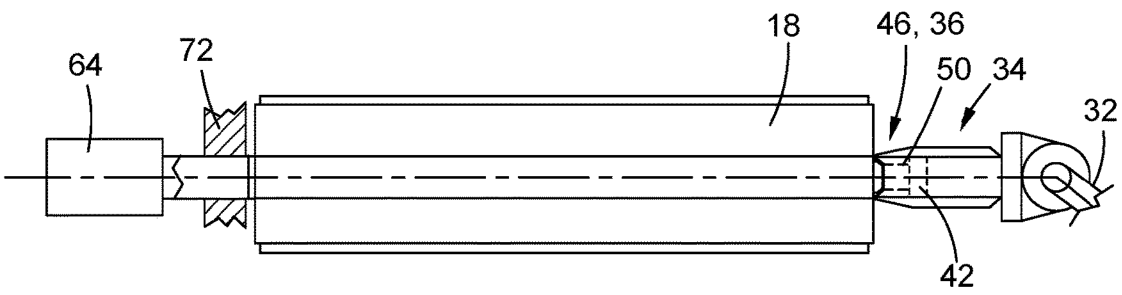
Figure 12:
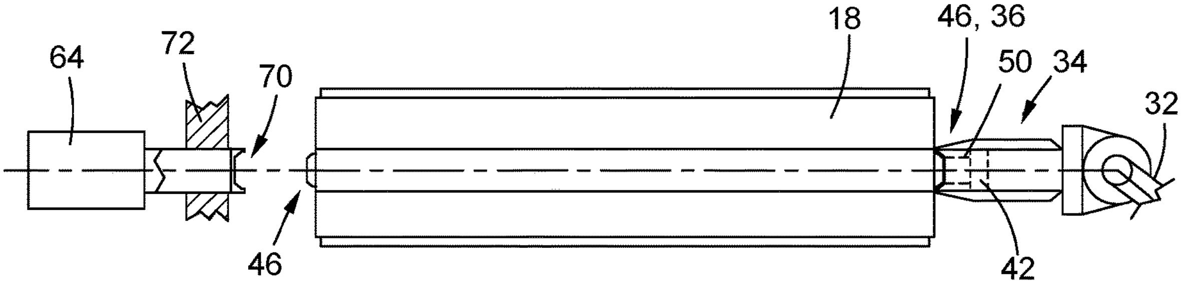

In this condition of the printing machine 12 each of the printing tools 14, 16, 18, 22, 24 is accessible by the end effector 34. This is illustrated in FIG. 10 by an end effector 34*a* to 34*e* being located adjacent to each of the printing tools 14, 16, 18, 22, 24. It is understood that this is done for illustrative purposes only. The printing assembly 10 comprises one printing tool handing unit 28 having one end effector 34 only.

In the following, the removing of the printing cylinder 18 will be explained in detail. In this context the printing cylinder 18 can be regarded as an exemplary printing tool. However, removal of the printing tools 14, 16, 22, 24 may be performed in an analogous way.

Firstly, the printing tool handling unit 28 is temporarily coupled to the coupling interface 46 located at the end of the shaft 60 of the printing tool 18 with its coupling interface 36. More precisely, the printing cylinder 18 is connected to the end effector 34 via the coupling interfaces 36, 46. At the same time the printing cylinder 18 is secured at the end effector 34 via the securing means 50, 42.

When connecting to the coupling interface 46 of the printing tool 18, the coupling interface 36 of the printing tool handling unit 28 is moved concentrically to the coupling interface 36 of the printing tool 18.

In detail, the contact surface 38 of the end effector 34 is brought in close proximity of the contact surface 48 of the printing cylinder 18, while the securing claws 43 are held in the release position by the actuation rod 44.

Then, the securing claws 43 are actuated via the actuation rod 44 such that the securing claws 43 are moved to the respective securing position (cf. FIG. 6).

In doing so, the contact surfaces 38, 48 are brought into abutment.

Thereafter the printing cylinder 18 is removed from the printing machine 12 along its axis of rotation. At the same time the coupling interface 46 provided on the shaft 60 and the coupling interface 70 provided on the output shaft 68 of the drive unit 64 are uncoupled.

The printing cylinder 18 can now be moved to a storage unit by the printing tool handling unit 28 and a different printing cylinder can be inserted into the printing machine 12.

In the example shown the printing cylinder 18 is moved to a separation unit 78.

The separation unit 78 comprises a clamping device 80.

Figure 13:
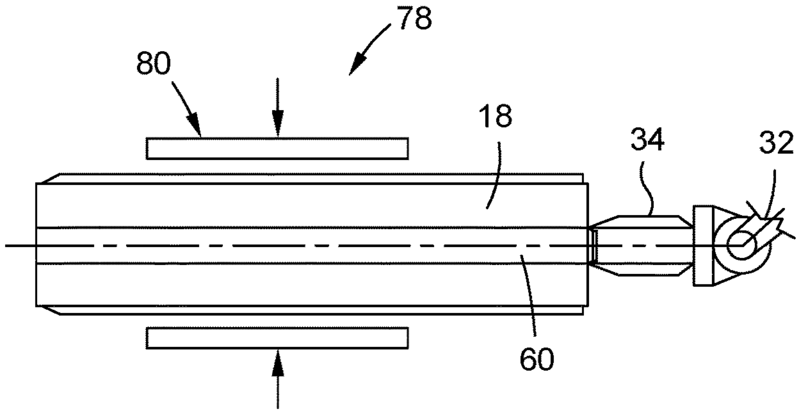

The printing tool handling unit 28 places the printing cylinder 18 in the clamping device 80 which clamps a sleeve 18*a* of the printing cylinder 18 (cf. arrows in FIG. 13).

Figure 14:
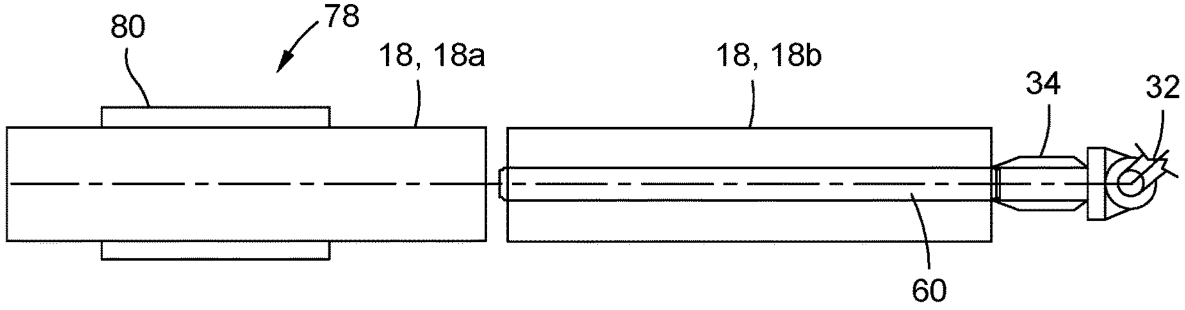

In this condition the shaft 60 and an adapter 18*b* of the printing cylinder 18 being interposed between the shaft 60 and the sleeve 18*a* can be separated from the sleeve 18*a* by pulling them out of the sleeve 18*a* along the axis of rotation of the printing cylinder (cf. FIG. 14).

Figure 15:
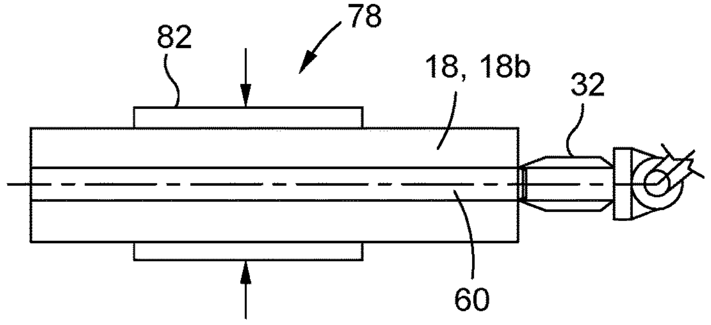

If the adapter 18*b* shall also be separated from the shaft 60, the assembly comprising the adapter 18*b* and the shaft 60 can be moved to a further clamping device 82 in which the adapter 18*b* will be clamped (cf. arrows in FIG. 15).

Figure 16:
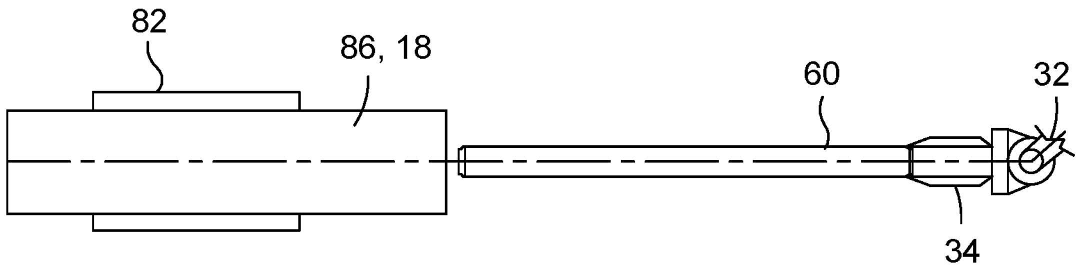

As a consequence thereof, that the shaft 60 can be withdrawn from the adapter 18*b* by pulling it out along an axis of rotation of the printing cylinder 18 (cf. FIG. 16).

Figure 17:
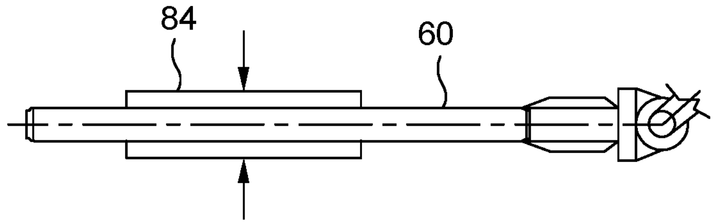

Thereafter the shaft 60 can be moved to another clamping device 84 and clamped therein (cf. arrows in FIG. 17).

Figure 18:
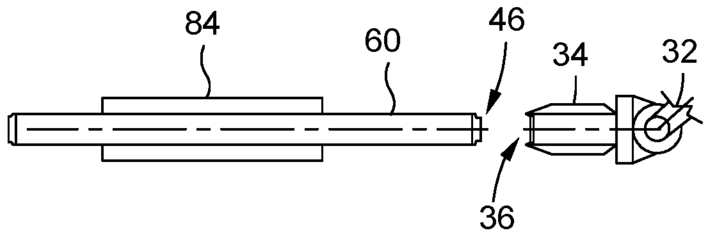

Now the securing means 42, 50 and the coupling interfaces 36, 46 can be disconnected such that the shaft 60 can be separated from the end effector 34 (cf. FIG. 18).

As a result of this procedure, the components of the printing cylinder 18, i.e. the sleeve 18*a*, the adapter 18*b* and the shaft 60 are stored separately such that they can be automatically recombined if needed.

The printing tool handling unit 28 is free to handle other printing tools.

The above procedure is preferably performed in a fully automatic manner.

It is understood that the above procedure can be applied in an analogous manner for inserting a printing tool into the printing machine 12.

The invention claimed is:

1. A method for automatically exchanging a sleeve of a printing tool mounted in a printing machine, in particular a flexographic printing machine, using a printing tool handling unit comprising a coupling interface, the printing tool comprising a shaft, the sleeve, and an adapter that is interposed between the shaft of the printing tool and the sleeve, the method comprising:

temporarily coupling the printing tool handling unit to a coupling interface of the printing tool located at an end of a shaft of the printing tool with the coupling interface, transporting, by the printing tool handling unit, the printing tool to a separation unit comprising at least one clamping device and placing, by the printing tool handling unit, the printing tool in the clamping device of the separation unit, clamping a sleeve of the printing tool by the clamping device, and separating, by the printing tool handling unit, the shaft from the sleeve by pulling the shaft out of the sleeve while the sleeve is clamped in the clamping device.

2. The method according to claim 1, wherein the printing tool is removed from the printing machine by moving the printing tool along an axis of rotation of the printing tool.

3. The method according to claim 1, wherein the shaft is separated from the sleeve by pulling the shaft out of the sleeve along an axis of rotation of the printing tool.

4. The method according to claim 1, wherein the coupling interface of the printing tool handling unit is moved concentrically to the coupling interface of the printing tool when connecting to the coupling interface of the printing tool.

5. The method according to claim 1, wherein the adapter is separated from the sleeve together with the shaft and afterwards an assembly comprising the adapter and the shaft is moved by the printing tool handling unit to a further clamping device in which the adapter is clamped and the shaft is withdrawn from the adapter.

6. The method according to claim 5, wherein after separating the adapter and the shaft, the shaft is moved to another clamping device and clamped therein.

7. The method according to claim 6, wherein after clamping the shaft in the clamping device, the shaft is separated from the printing tool handling unit.

8. The method according to claim 1, wherein the clamping device comprises at least two clamping jaws, wherein the printing tool is surrounded by the clamping jaws when the printing tool is inserted in the separation unit, and wherein the clamping jaws are moved towards the printing tool in a radial direction in order to clamp the sleeve of the printing tool.

9. The method according to claim 5, wherein the separation of the sleeve and/or the adapter from the shaft is performed in a fully automatic manner by the printing tool handling unit.

10. The method according to claim 1, wherein the shaft of the printing tool is supported in the printing machine in a double sided manner, and wherein a support of the printing tool is removed on one side in order to access the printing tool with the printing tool handling unit.

* * * * *